(12) United States Patent
Miyazaki et al.

(10) Patent No.: US 9,703,111 B2
(45) Date of Patent: Jul. 11, 2017

(54) LASER PROCESSING MACHINE AND FOCUSING ANGLE SETTING METHOD OF LASER PROCESSING MACHINE

(71) Applicant: PANASONIC INDUSTRIAL DEVICES SUNX CO., LTD., Aichi (JP)

(72) Inventors: Takayoshi Miyazaki, Aichi (JP); Tomoki Komiya, Aichi (JP); Takuya Yoshimi, Aichi (JP)

(73) Assignee: PANASONIC INDUSTRIAL DEVICES SUNX CO., LTD., Aichi (JP)

( * ) Notice: Subject to any disclaimer, the term of this patent is extended or adjusted under 35 U.S.C. 154(b) by 0 days.

(21) Appl. No.: 15/079,668

(22) Filed: Mar. 24, 2016

(65) Prior Publication Data
US 2016/0349525 A1    Dec. 1, 2016

(30) Foreign Application Priority Data

May 29, 2015 (JP) ................................. 2015-110822

(51) Int. Cl.
*G02B 26/08* (2006.01)
*G02B 27/40* (2006.01)
(Continued)

(52) U.S. Cl.
CPC .......... *G02B 27/40* (2013.01); *B23K 26/0648* (2013.01); *B23K 26/082* (2015.10);
(Continued)

(58) Field of Classification Search
CPC .. G02B 26/105; G02B 27/40; B23K 26/0648; B23K 26/082; H01S 3/005; H01S 3/1305;
(Continued)

(56) References Cited

U.S. PATENT DOCUMENTS 3,797,908 A    3/1974 Ward et al.
5,231,280 A    7/1993 Imakawa
(Continued)

FOREIGN PATENT DOCUMENTS

JP    2007-111763 A    5/2007
JP    2009-208093 A    9/2009

OTHER PUBLICATIONS

The extended European search report issued by the European Patent Office on Oct. 19, 2016, which corresponds to European Patent Application No. 16161891.3-1556 and is related to U.S. Appl. No. 15/079,668.

*Primary Examiner* — James Phan
(74) *Attorney, Agent, or Firm* — Studebaker & Brackett PC

(57) ABSTRACT

A laser processing machine includes: a laser oscillator which emits laser light; a scanning unit which scans a processing target surface of a work by deflecting the laser light emitted from the laser oscillator; and a focusing unit which is disposed between the laser oscillator and the scanning unit and which focuses the laser light emitted from the laser oscillator. The focusing unit is set so as to focus the laser light at a second position that is more distant from a first position where the laser light is incident vertically than a third position that is farthest from the first position in the processing target surface of the work.

5 Claims, 11 Drawing Sheets

(51) Int. Cl.
*B23K 26/06* (2014.01)
*H01S 3/00* (2006.01)
*B23K 26/082* (2014.01)
*G02B 26/10* (2006.01)
*B29C 65/16* (2006.01)
*H01S 3/13* (2006.01)
*B29C 65/00* (2006.01)

(52) U.S. Cl.
CPC ............ *G02B 26/105* (2013.01); *H01S 3/005* (2013.01); *B29C 65/1635* (2013.01); *B29C 65/1654* (2013.01); *B29C 66/1122* (2013.01); *B29C 66/41* (2013.01); *H01S 3/1305* (2013.01)

(58) Field of Classification Search
CPC ............ B29C 65/1635; B29C 65/1654; B29C 66/41; B29C 66/1122
USPC ......... 359/209.1, 210.1, 212.1–215.1, 223.1, 359/822, 823; 219/121.6, 121.63, 121.64, 219/121.74, 121.75, 121.78, 121.79
See application file for complete search history.

(56) References Cited

U.S. PATENT DOCUMENTS

| | | |
|---|---|---|
| 6,295,116 B1 | 9/2001 | Eom |
| 2007/0100492 A1 | 5/2007 | Idaka et al. |
| 2016/0001402 A1* | 1/2016 | Martinsen ............ B23K 26/362 264/400 |

* cited by examiner

LASER PROCESSING MACHINE AND FOCUSING ANGLE SETTING METHOD OF LASER PROCESSING MACHINE

CROSS-REFERENCE TO RELATED APPLICATION(S)

This application is based on and claims priority from Japanese Patent Application No. 2015-110822 filed on May 29, 2015, the entire contents of which are incorporated herein by reference.

BACKGROUND

1. Field of the Invention

One or more embodiments of the present invention relate to a laser processing machine for scanning the processing target surface of a work by deflecting laser light.

2. Description of Related Art

Among conventional laser processing machines that scan the processing target surface of a work by deflecting laser light emitted from a laser oscillator are ones in which a focal position of laser light can be set (refer to JP-A-2009-208093, for example). In a laser marking machine disclosed in JP-A-2009-208093, a focal position setting means is disposed between a laser light source and a scanning unit and a focusing lens is disposed between the scanning unit and a work. A focal position is set by changing the beam diameter or divergence angle of laser light incident on the focusing lens by the focal position setting means.

Laser processing machines are also known that are equipped with what is called a Z module for setting a focal distance during work processing (refer to JP-A-2007-111763, for example). In the laser processing machine disclosed in JP-A-2007-111763 which is equipped with a Z-axis scanner, a focal position is set by the Z-axis scanner during work processing.

SUMMARY

In the laser marking machine disclosed in JP-A-2009-208093, a flat processing target surface of a work is irradiated perpendicularly with laser light and a focal position is set so that a resulting light spot has an intended area. However, the area of a light spot is larger at a position where laser light is incident obliquely than at a position of vertical incidence. Therefore, in the laser marking machine disclosed in JP-A-2009-208093, the light spot area varies depending on the position on a processing target surface, possibly lowering the processing quality.

Incidentally, in the laser marking machine disclosed in JP-A-2009-208093, it is possible to decrease a variation of light spot areas using a focusing lens that causes laser light to shine on a work vertically at any position. However, with such a focusing lens, the processing region is made small because, in general, it enables vertical incidence of laser light only in a narrow range. To enlarge the processing region, it is necessary to increase the lens diameter, which renders the laser marking machine expensive.

In conventional laser processing machines that are equipped with a Z module, a variation of light spot areas can be reduced by setting the focal position dynamically during processing. However, to this end, it is necessary to adjust the focusing position in the Z-axis direction at high speed in real time according to the processing coordinates in synchronism with a high-speed movement of a scanning unit. As a result, the laser processing machine is made complex in structure and hence expensive.

This specification discloses a technique that can suppress reduction of processing quality due to a variation of light spot areas with a simple configuration and decrease a variation of light spot areas over the entire processing target surface of a work. The specification also discloses a technique that can suppress reduction of processing quality due to a variation of light spot areas with a simple configuration.

Disclosed in this specification is a laser processing machine including: a laser oscillator which emits laser light; a scanning unit which scans a processing target surface of a work by deflecting the laser light emitted from the laser oscillator; and a focusing unit which is disposed between the laser oscillator and the scanning unit and which focuses the laser light emitted from the laser oscillator, wherein the focusing unit is set so as to focus the laser light at a second position that is more distant from a first position where the laser light is incident vertically than a third position that is farthest from the first position in the processing target surface of the work.

With this laser processing machine, a variation of light spot areas can be reduced without using any additional focusing lens by setting (fixedly or adjustably) the focusing unit so that it focuses laser light so that the area of a light spot formed on a flat processing target surface at the first position where the laser light is incident vertically approximately coincides with that of a light spot formed at the second position where laser light is incident obliquely. As a result, the laser processing machine can be made simpler in configuration.

Furthermore, since the focusing unit need not follow the scanning unit during work processing, the focusing unit can be simplified in structure. As a result, reduction of processing quality due to a variation of light spot areas can be suppressed by a simple configuration and hence the manufacturing cost can be reduced.

Still further, with this laser processing machine, a variation of light spot areas can be reduced over the entire processing target surface of the work by setting the focusing unit so that light spot areas approximately coincide with each other at the two positions that are distant from each other.

The laser processing machine may be configured so that a focusing position of the focusing unit is adjustable.

With this laser processing machine, even if the work size is changed, a variation of light spot areas can be reduced over the entire processing target surface of the new work by setting a focusing position outside the processing target surface of the new work.

The focusing unit may focus the laser light at a position that is located outside a processing region of the laser processing machine.

With this laser processing machine, even if the work size is changed, a variation of light spot areas can be reduced over the entire processing target surface of the new work.

The focusing unit may be configured such that a focal position of the focusing unit in a direction in which the laser light is incident vertically is allowed to be set at the second position.

With this laser processing machine, even if the distance from the scanning unit to the processing target surface of the work (work distance) is changed, a variation of light spot areas can be reduced over the entire processing target surface of the work.

Also disclosed in this specification is a focusing angle setting method of a laser processing machine including a laser oscillator which emits laser light, a scanning unit which scans a processing target surface of a work by deflecting the laser light emitted from the laser oscillator, a focusing unit which is disposed between the laser oscillator and the scanning unit and focuses the laser light emitted from the laser oscillator, and a setting unit which sets a focusing angle of the focusing unit before processing of the work, the focusing angle setting method including: setting a focusing angle using the setting unit such that an area of a light spot formed on a flat processing target surface at a first position where the laser light is incident vertically approximately coincides with that of a light spot formed at a second position that is distant from the first position and where the laser light is incident obliquely.

This focusing angle setting method can suppress reduction of processing quality due to a variation of light spot areas with a simple configuration.

In the laser processing machine disclosed in the specification, reduction of processing quality due to a variation of light spot areas can be suppressed with a simple configuration and a variation of light spot areas can be decreased over the entire processing target surface of a work.

The focusing angle setting method of a laser processing machine disclosed in the specification makes it possible to suppress reduction of processing quality due to a variation of light spot areas with a simple configuration.

DETAILED DESCRIPTION

Embodiment

An embodiment of the present invention will be hereinafter described with reference to FIGS. 1-11.

(1) Configuration of Laser Processing Machine

Figure 1:
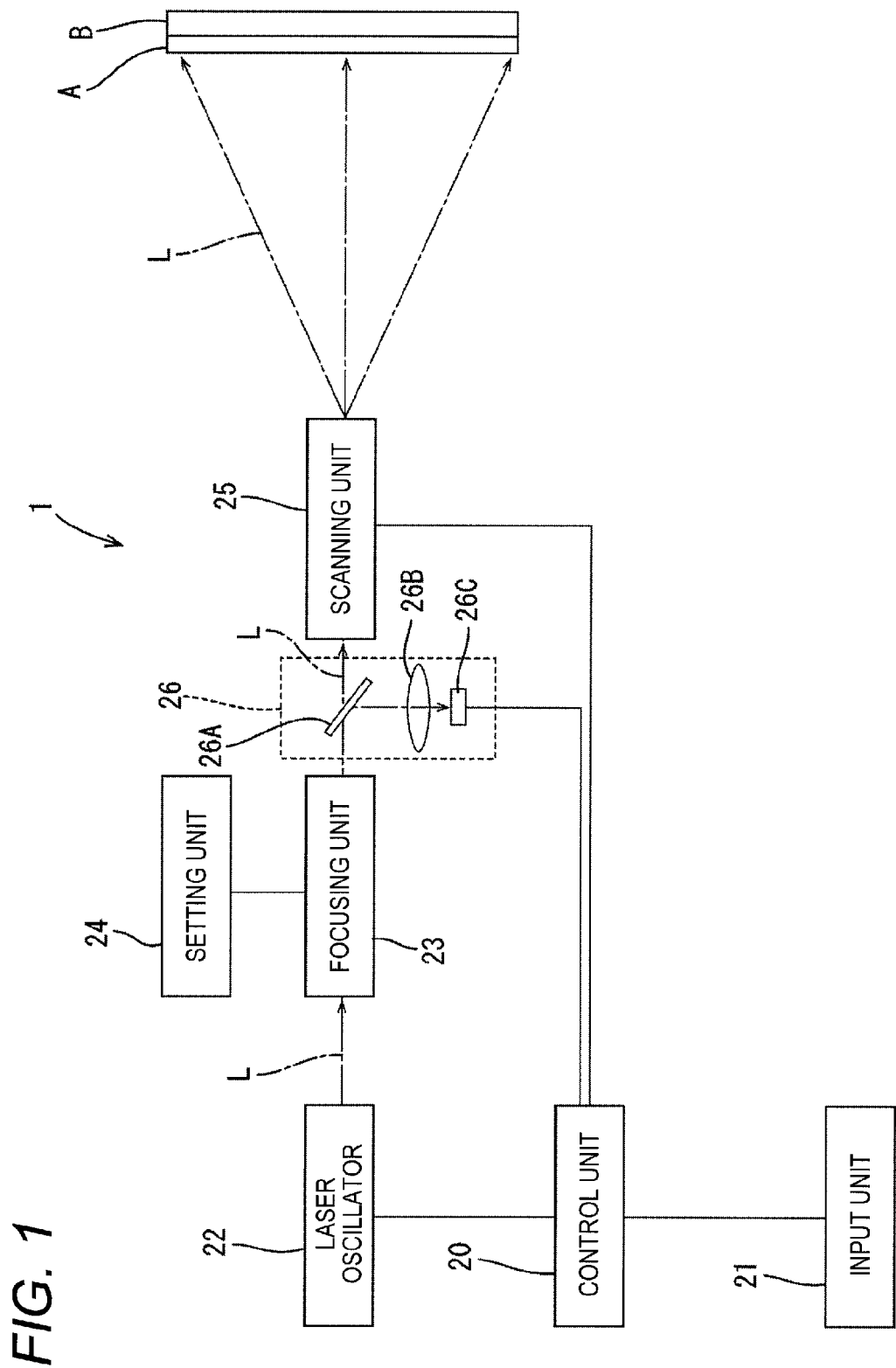
FIG. 1 is a block diagram of a laser processing machine according to an embodiment of the present invention.

The configuration of a laser welding machine 1 which is a laser processing machine according to the embodiment will be described with reference to FIG. 1. The laser welding machine 1 is to weld two resin members A and B together by laser light. Whereas the resin member A is made of a material that transmits laser light almost completely, the resin member B is made of a material that absorbs laser light. When the resin member B melts absorbing laser light from the resin member A, the resin member A also melts receiving resulting heat, whereby the resin members A and B are welded together.

The laser welding machine 1 is equipped with a control unit 20, an input unit 21, a laser oscillator 22, a focusing unit 23, a setting unit 24, a scanning unit 25, a laser power monitoring unit 26, etc.

The control unit 20 is equipped with a CPU, a ROM, and a RAM, etc. The CPU controls the individual units of the laser welding machine 1 by running control programs stored in the ROM. The ROM is stored with the control programs to be run by the CPU, various kinds of data to be used for controls, and other information. The RAM is used as a main storage device when the CPU performs various kinds of processing. The control unit 20 may be equipped with, instead of the CPU, an FPGA (field programmable gate array), an ASIC (application-specific integrated circuit), or the like.

The input unit 21 consists of input devices such as a keyboard and a mouse, a display device such as a liquid crystal display, and other devices. By manipulating the input unit 21, a worker can set a laser power, a scanning speed, a work distance, a processing pattern 11 (see FIG. 6), etc. The input unit 21 may be equipped with a touch panel.

The laser oscillator 22 is a carbon dioxide gas laser which is a gas laser, a YAG laser which is a solid-state laser, a semiconductor laser, a fiber laser, or the like, and emits laser light toward the focusing unit 23. The laser oscillator 22 is configured so that the laser power is adjustable, and the laser power is controlled by the control unit 20.

The focusing unit 23 focuses laser light emitted from the laser oscillator 22. The setting unit 24 through which a worker sets a focusing angle of the focusing unit 23 before laser processing is provided integrally with the focusing unit 23. Specific configurations of the focusing unit 23 and the setting unit 24 will be described later.

The scanning unit 25, which is of what is called a galvanometer scanning type, is equipped with two galvanometer mirrors for reflecting laser light, two drive motors for varying the angles of the galvanometer mirrors, respectively, and other components. The angle of one galvanometer mirror is varied in the vertical direction being driven by one drive motor, and the angle of the other galvanometer mirror is varied in the horizontal direction being driven by the other drive motor. As a result, the laser light irradiation point is moved two-dimensionally on the processing target surface of the resin member B (hereinafter referred to as a "work B").

It suffices that the scanning unit 25 be a unit capable of deflecting laser light. For example, the scanning unit 25 may be such as to employ polygon mirrors in place of the galvanometer mirrors or employ a combination of a polygon mirror and a galvanometer mirror.

The laser power monitoring unit 26 is a unit for allowing the control unit 20 to monitor the laser power. A specific configuration of the laser power monitoring unit 26 will be described later.

Figure 2:
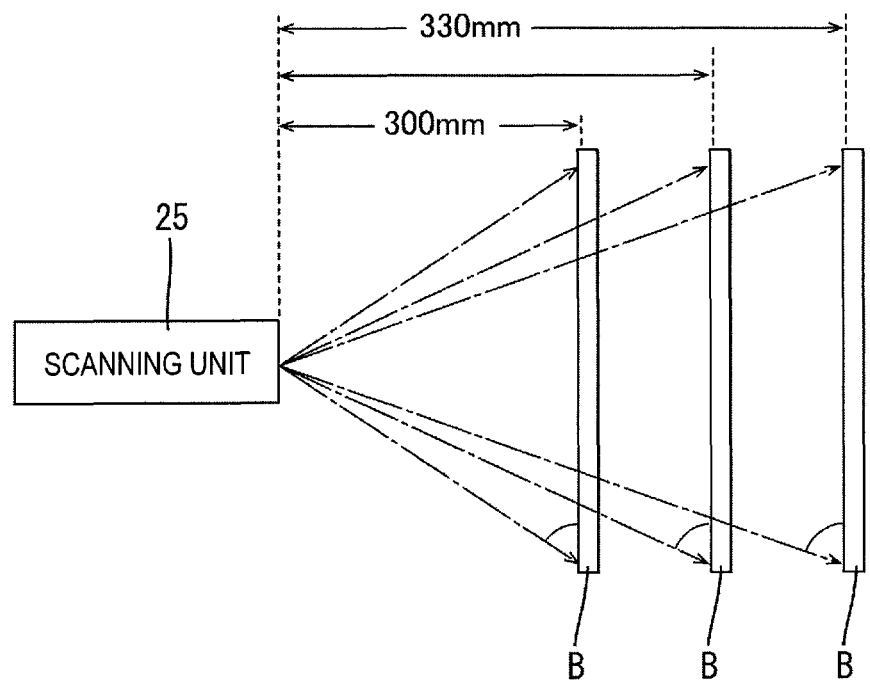
FIG. 2 is a schematic diagram showing a work distance range that the laser processing machine can accommodate.

As shown in FIG. 2, the laser welding machine 1 can accommodate a range 300 to 330 mm of the distance from the scanning unit 25 to the processing target surface of the work B. In the following description, the distance from the scanning unit 25 to the processing target surface of the work B will be referred to as a "work distance."

(2) Focusing Unit 23 and Setting Unit 24

Figure 3:
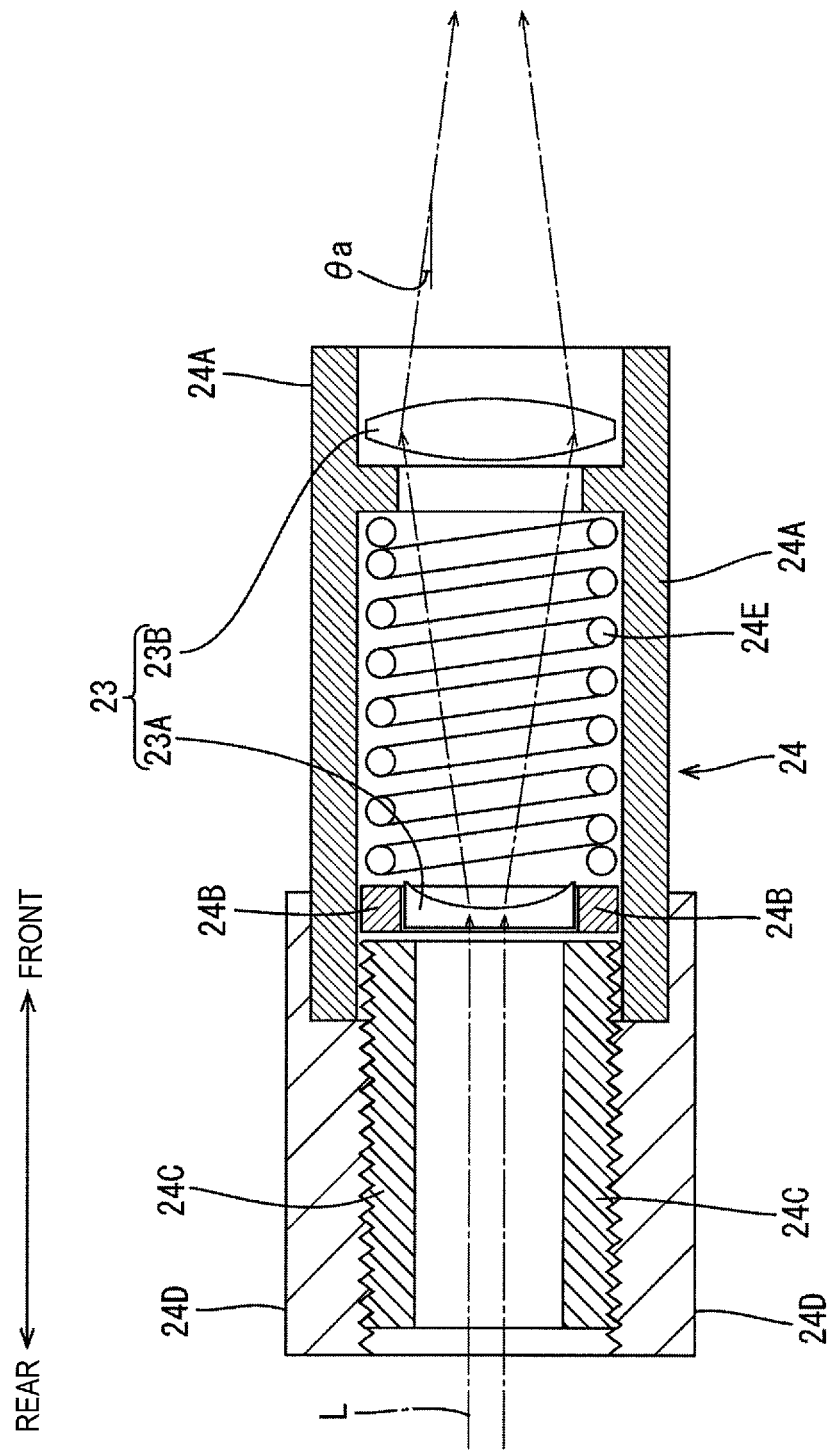
FIG. 3 is a sectional view of a focusing unit and a setting unit.

Next, specific configurations of the focusing unit 23 and the setting unit 24 will be described with reference to FIG. 3. The focusing unit 23 is equipped with a magnifying lens 23A and a focusing lens 23B. Laser light L is expanded in beam diameter by the magnifying lens 23A and then focused by the focusing lens 23B so as to have a focusing angle θa.

The setting unit 24, which serves to set a focusing angle θa of the focusing unit 23, is equipped with a cylindrical body 24A, a holder 24B which holds the magnifying lens 23A, a holder moving unit 24C, an adjustment screw 24D, a compression coil spring 24E, etc.

The holder 24B, which is a cylindrical member, is inserted (i.e., fitted) in the body 24A so as to be movable in the optical axis direction. The outer circumferential surface of the holder 24B is formed with a projection (not shown). On the other hand, the inner circumferential surface of the body 24A is formed with a guide groove (not shown) for guiding the projection of the holder 24B in the optical axis direction. The projection of the holder 24B is fitted in the guide groove of the body 24A, whereby rotation of the holder 24B about the optical axis is prevented.

Part of the holder moving unit 24C, which is a cylindrical member, is inserted (i.e., fitted) in the body 24A so as to be movable in the optical axis direction. The outer circumferential surface of the holder moving unit 24C is formed with threads.

The adjustment screw 24D is also a cylindrical member. A rear portion of the body 24A is fitted in a front, inside portion of the adjustment screw 24D, whereby the adjustment screw 24D is attached to the body 24A so as to be rotatable coaxially with the body 24A. The inner circumferential surface of the adjustment screw 24D is formed with threads that are in mesh with the threads that are formed in the outer circumferential surface of the holder moving unit 24C. The compression coil spring 24E serves to push the holder 24B rearward.

If a worker rotates the adjustment screw 24D in one rotational direction, the holder moving unit 24C is moved forward and the holder 24B is also moved forward being pushed by the holder moving unit 24C. As a result, the distance between the magnifying lens 23A and the focusing lens 23B is decreased and the focusing angle θa of laser light L is thereby narrowed.

On the other hand, if the worker rotates the adjustment screw 24D in the other rotational direction, the holder moving unit 24C is moved rearward and the holder 24B is also moved rearward being urged by the compression coil spring 24E. As a result, the distance between the magnifying lens 23A and the focusing lens 23B is increased and the focusing angle θa of laser light L is thereby widened.

(3) Reduction of Variation of Light Spot Areas

Figure 4:
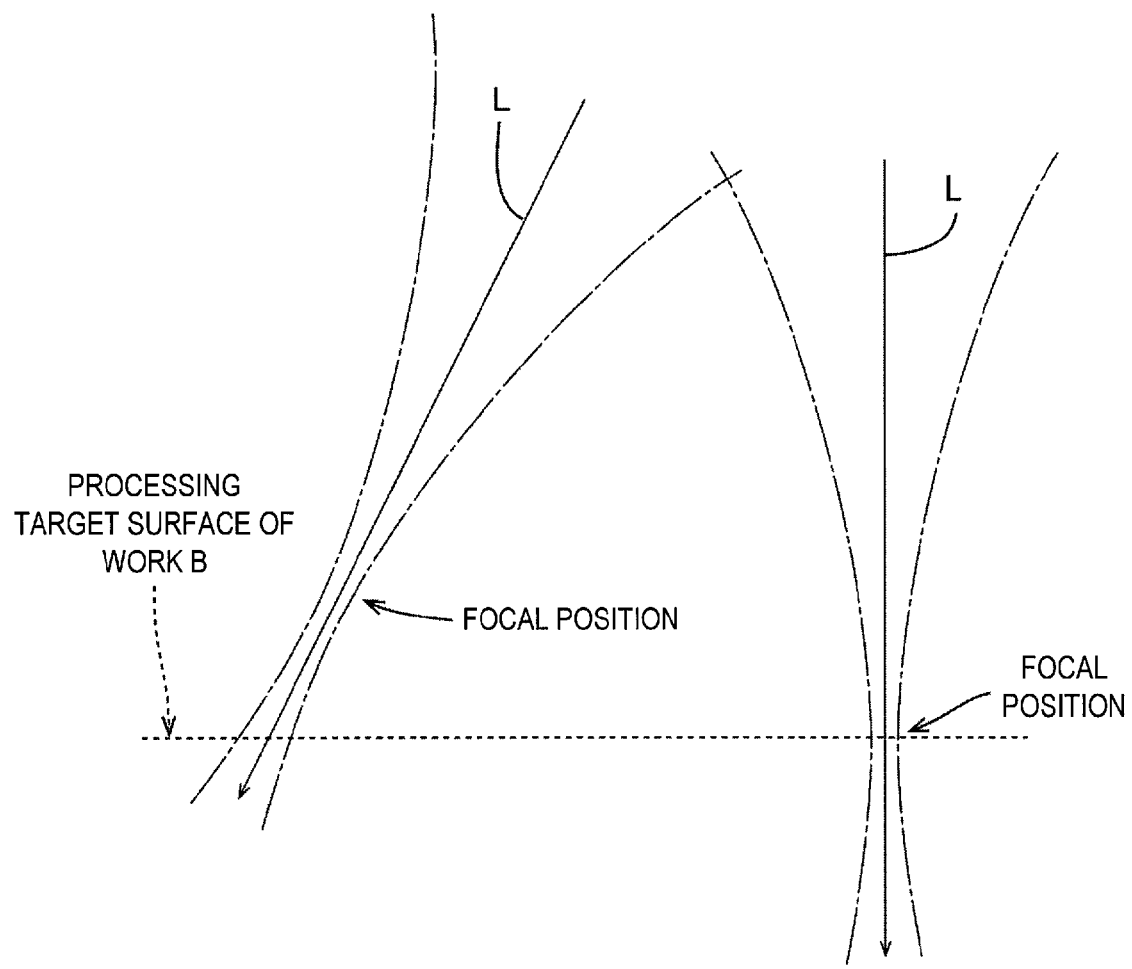
FIG. 4 is a schematic diagram showing a state that the focal position is located at a position where laser light is incident vertically.

FIG. 4 shows a state that laser light L is focused on the processing target surface of the work B at a position of vertical incidence. In the embodiment, the position of vertical incidence of laser light L is the center of a processing region 12 (see FIG. 6). The processing region 12 is a maximum region where a work to be processed can be placed. However, where located at an end of a deflection angle range of the scanning unit 25, the position of the vertical incidence of laser light L may deviate from the center of the processing region 12.

In the state shown in FIG. 4, at a position where laser light L shines on the processing target surface of the work B obliquely, an elliptical light spot having a wider area is formed and the laser light L has a larger beam diameter. Therefore, the area of a light spot that is formed at a position where laser light L is incident obliquely is larger than that of a light spot that is formed at the position of vertical incidence. That is, in the state shown in FIG. 4, there is a variation between the area of a light spot that is formed at the position where laser light L is incident vertically and that of a light spot that is formed at a position where laser light L is incident obliquely.

Figure 5:
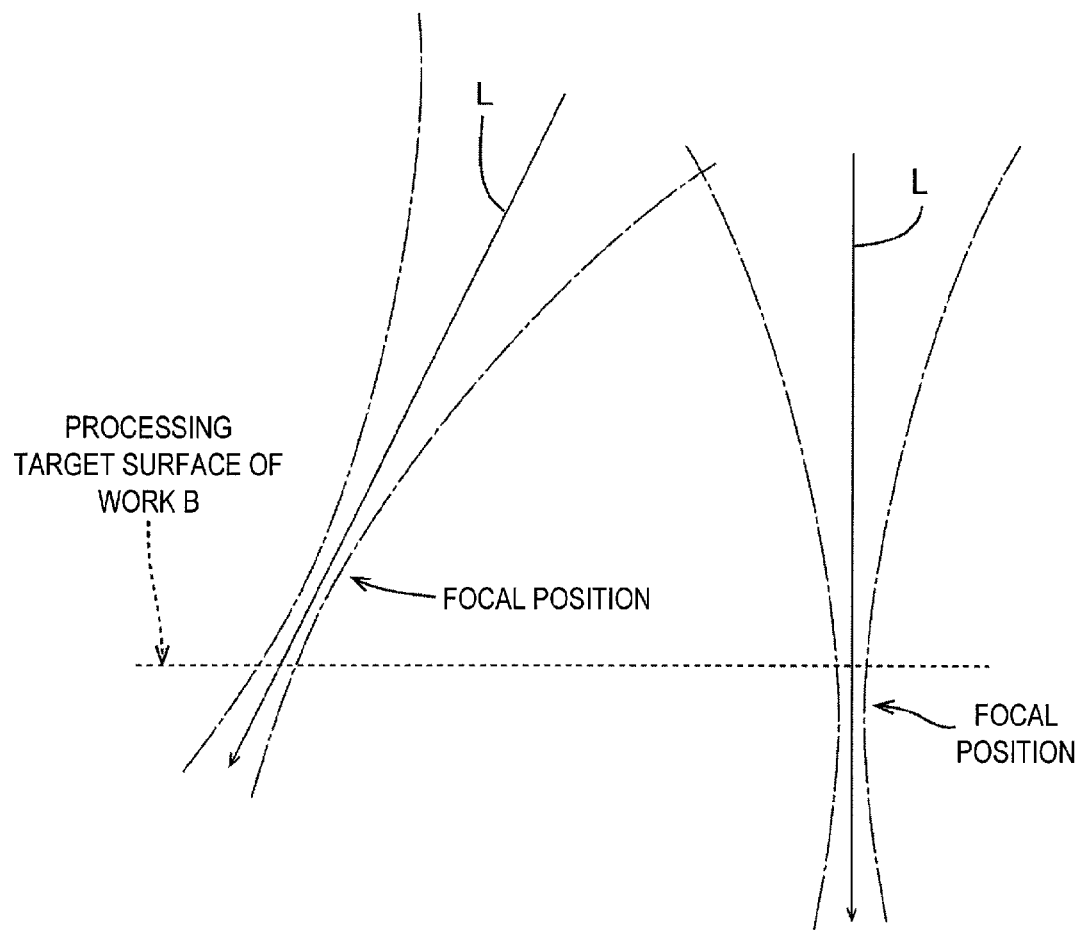
FIG. 5 is a schematic diagram showing a state that the area of a light spot that is formed at the position where laser light is incident vertically is equal to that of a light spot formed at a position where laser light is incident obliquely.

In view of the above, in the embodiment, as shown in FIG. 5, a focal point of laser light L is deviated intentionally from the position where the laser light L is incident vertically, whereby the area of a light spot that is formed at the position where laser light L is incident vertically is made equal to that of a light spot formed at a position where laser light L is incident obliquely. In the following description, deviating a focal point will be referred to as "defocusing."

When laser light L is defocused so that a focal point is deviated from the position where the laser light L is incident vertically, the area of a light spot that is formed at the position of vertical incidence is increased. On the other hand, at a position where laser light L is incident obliquely, the beam diameter of the laser light L is reduced and the light spot area is decreased by the defocusing whereas the light spot remains elliptical. Therefore, by properly setting a focal position, the area of a light spot that is formed at the position of vertical incidence can be made equal to that of a light spot formed at a position of oblique incidence, that is, a variation of light spot areas can be decreased.

In the embodiment, a focal position is set by a worker before a start of processing of the work B. During processing of the work B, the focal position is fixed at the position that was set by the worker. How a focal position is set by a worker will be described below with reference to FIG. 6.

Figure 6:
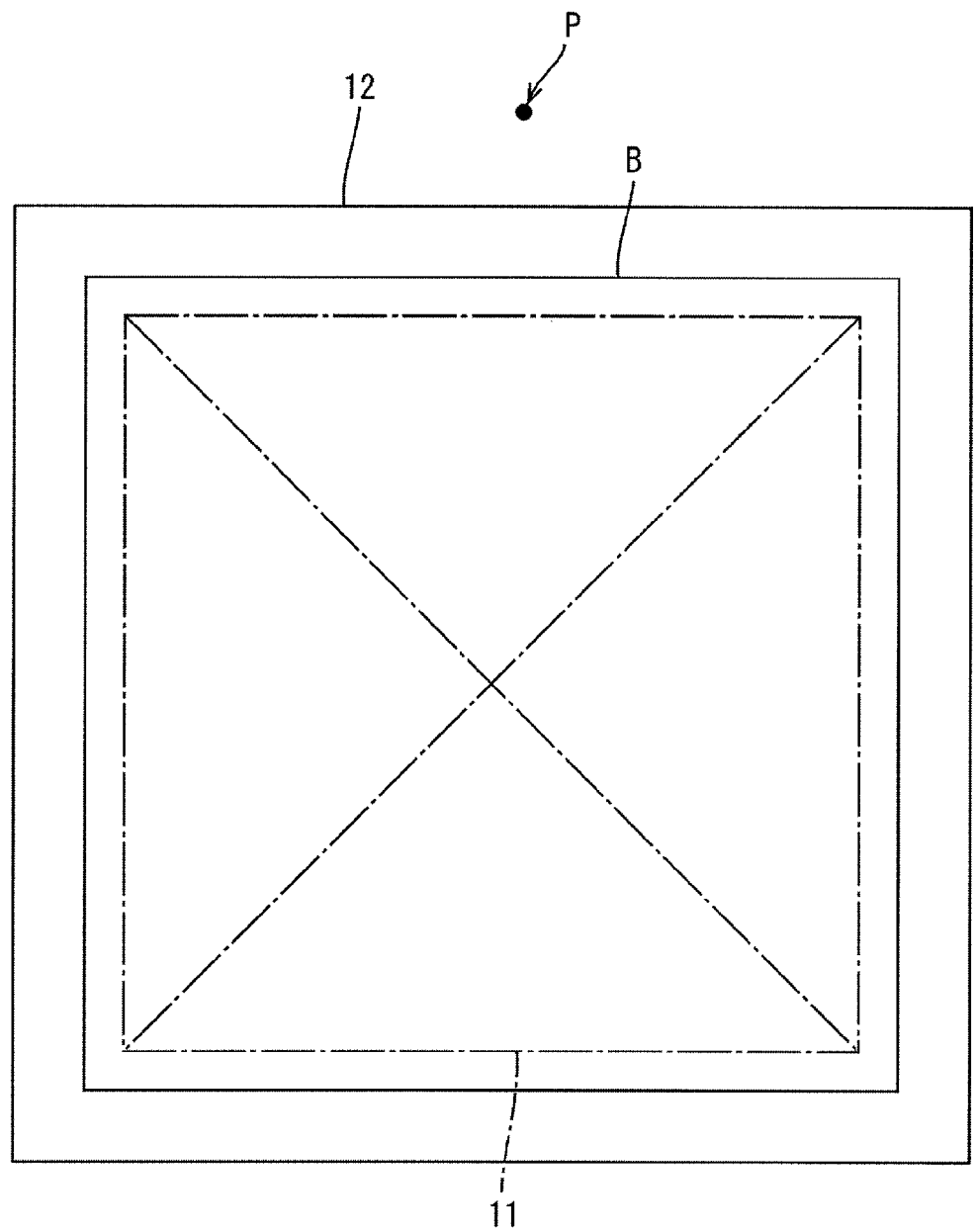
FIG. 6 is a schematic diagram showing a processing pattern.

In FIG. 6, chain lines 11 indicate an example processing pattern of scanning with laser light L on the processing target surface of the work B. The center of the processing pattern 11 is a position where laser light L is incident on the processing target surface vertically and the laser light optical path length is shortest among positions in the processing pattern 11. The four corners of the processing pattern 11 are positions where laser light L is incident obliquely and the laser light optical path length is greatest among the positions in the processing pattern 11. In FIG. 6, a solid line 12 indicates a processing region of the laser welding machine 1. It is assumed that the laser welding machine 1 according to the embodiment can also irradiate a region outside the processing region 12 with laser light L.

A position P is a position that is more distant from the position of vertical incidence than a point that is farthest from the position of vertical incidence in the processing target surface of the work B (i.e., one of the four corners of the processing target surface of the work B). More specifically, the position P is a position that is located outside the processing region 12. The position P is referred to as a "focusing position." In the following description, the term "position where laser light L is incident obliquely" means the position P.

To determine a focal position, a worker actually processes a test work that is larger in area than the processing region 12 using the laser welding machine 1 and measures an area of a processing mark formed at the position where laser light L was incident vertically and an area of a processing mark formed at the position where laser light L was incident obliquely. By repeating this operation while changing the focusing angle θa of the focusing unit 23 little by little by means of the setting unit 24, the worker can determine a focal position so that the area of a light spot formed at the position where laser light L is incident vertically and that of a light spot formed at the position where laser light L is incident obliquely.

The worker can set a focal position in a direction in which the laser light L is incident vertically at the position P by adjusting the focusing angle θa of the focusing unit 23 using the setting unit 24.

Next, referring to FIG. 7, a description will be made of the fact that a focusing angle θa exists at which the area of a light spot formed at the position where laser light L is incident vertically coincides with that of a light spot formed at the position where laser light L is incident obliquely.

Figure 7:
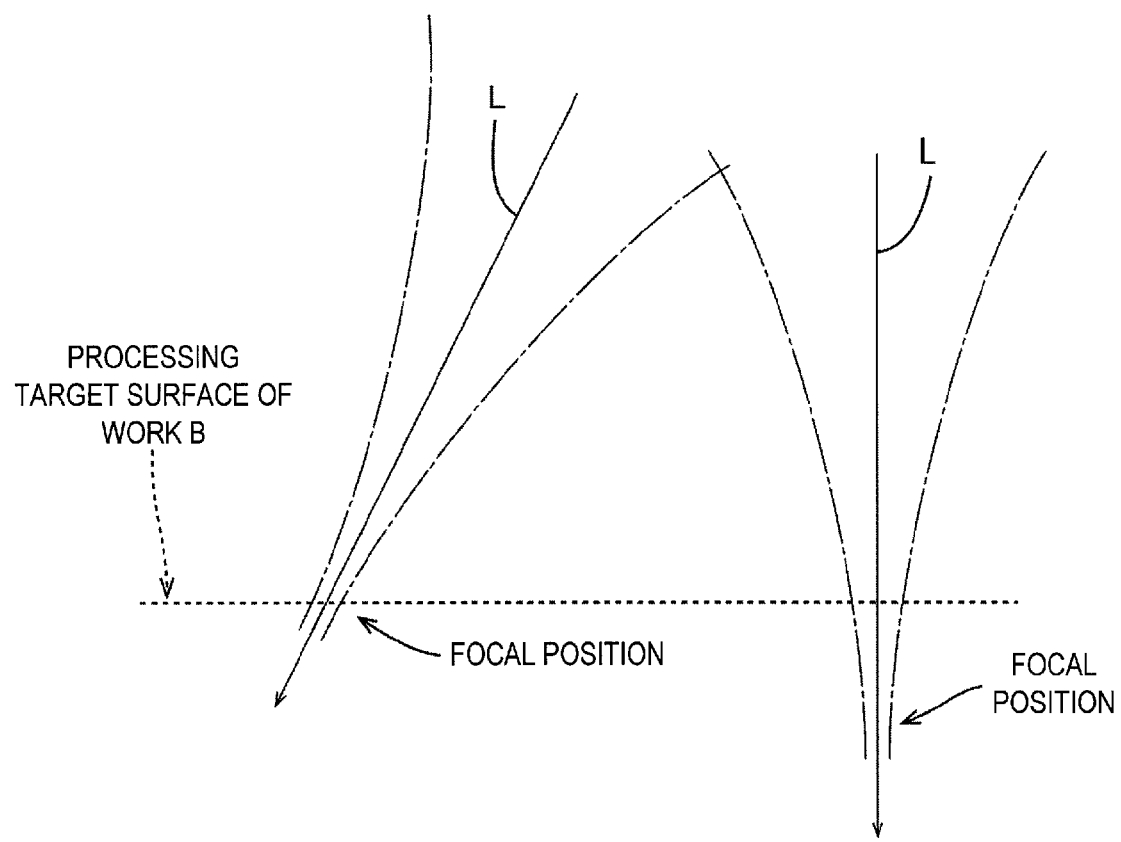
FIG. 7 is a schematic diagram showing a state that the focal position is located at a position where laser light is incident obliquely.

FIG. 7 shows a state that laser light L is focused on the processing target surface of the work B at the position of oblique incidence. It is assumed here that the area of a light spot formed at the position where laser light L that is assumed to be parallel light is incident obliquely is 107% of that of a light spot formed at the position where laser light L is incident vertically.

With the above assumption, since the area of a light spot of laser light L is proportional to the square of its beam radius, if the square of the beam radius of laser light L at the position of oblique incidence is smaller by more than 7% than that at the position of vertical incidence, the area of a light spot formed at the position of oblique incidence becomes smaller than that of a light spot formed at the position of vertical incidence.

In other words, since the square root of 7 is about 2.65, if the beam radius of laser light L at the position of oblique incidence is smaller by more than 2.65% than that at the position of vertical incidence, the area of a light spot formed at the position of oblique incidence becomes smaller than that of a light spot formed at the position of vertical incidence.

The beam radium of laser light L is given by Equation (1) as follows:

$$\omega_z^2 = \omega_0^2 \left\{ 1 + \left( \frac{\lambda \cdot z}{\pi \omega_0^2} \right)^2 \right\}$$

Figure 8:
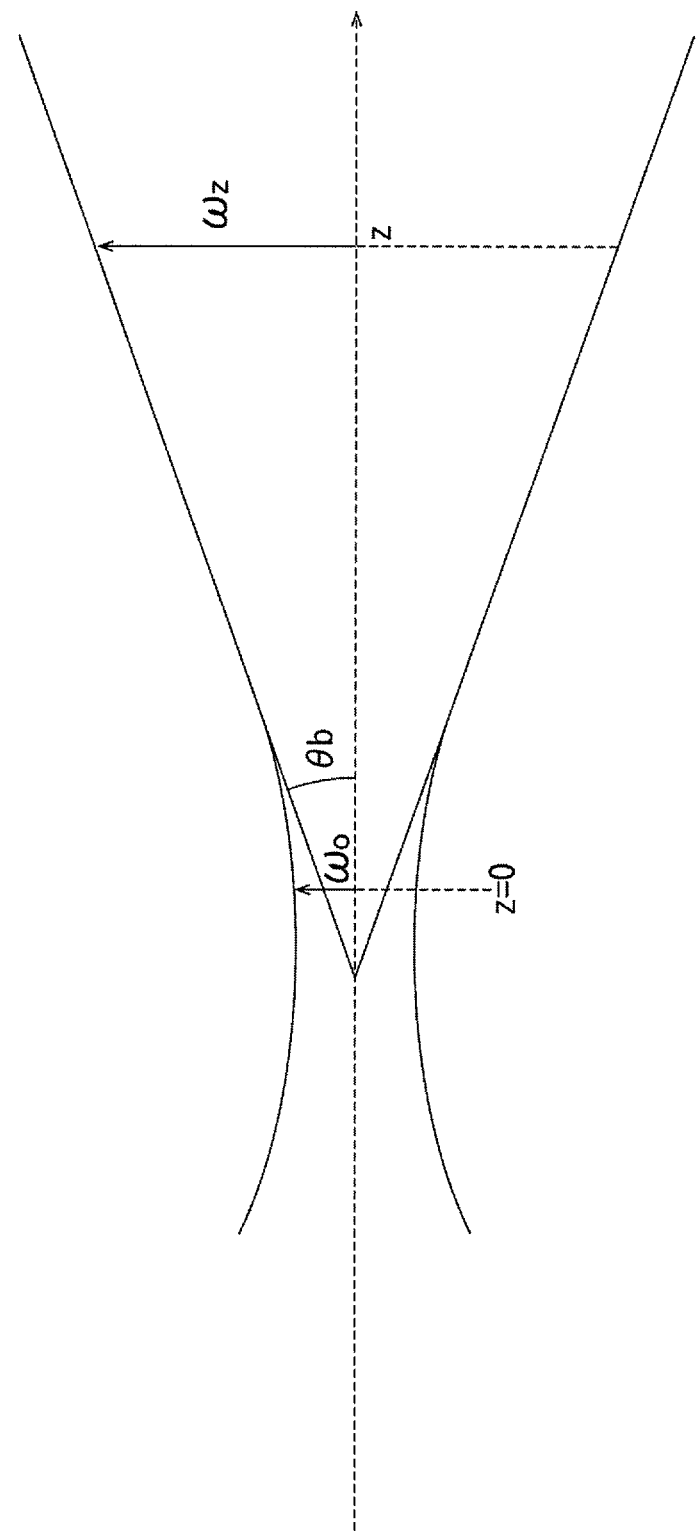
FIG. 8 is a schematic diagram illustrating a variable and parameters of an equation for calculating a beam radius of laser light.

In Equation (1), as shown in FIG. 8, z is the distance from a beam waist (i.e., a position where the beam radius is smallest), $\omega_z$ is the beam radius at a position having the distance z, $\lambda$ is the wavelength of light, and $\omega_0$ is the beam radius at the beam waist. As shown in FIG. 8, in a range where z is sufficiently large, in a sectional view, the beam external boundary assumes straight lines each of which forms an angle θb with the optical axis.

Since beam radii at respective points on the optical path of laser light L can be calculated according to Equation (1), it is possible to set the beam radius of laser light L at the position of oblique incidence smaller than that at the position of vertical incidence by more than 2.65% by properly setting a section for processing on the optical path of laser light L by, for example, adjusting the optical path length on the basis of beam radius calculation results.

Therefore, there exists, between the focusing angles θa shown in FIGS. 4 and 7, a focusing angle θa at which the area of a light spot formed at the position where laser light L is incident vertically coincides with that of a light spot formed at the position where laser light L is incident obliquely. As a result, it is possible to equalize the area of a light spot formed at the position of vertical incidence and that of a light spot formed at the position of oblique incidence.

(4) Setting Range of Focusing Angle θa

In the setting unit 24, a focusing angle θa setting range is set so that a focusing angle θa can be set so that the area of a light spot formed at the position where laser light L is incident vertically coincides with that of a light spot formed at the position where laser light L is incident obliquely. In other words, a movement range of the holder 24B is set so that a focusing angle θa at which the above two light spot areas coincide with each other can be set.

Incidentally, if the work distance is always constant, the focusing angle θa can be fixed. However, in the embodiment, since it is assumed that the laser welding machine 1 can accommodate a work distance range of 300 to 330 mm, the focusing angle θa cannot be fixed. Therefore, in the setting unit 24, a focusing angle θa setting range is set so as to include both of a focusing angle θa at which the two light spot areas coincide with each other when the work distance is equal to 300 mm and a focusing angle θa at which the two light spot areas coincide with each other when the work distance is equal to 330 mm.

(5) Area of Light Spot Formed at Intermediate Position

Next, referring to FIGS. 9-11, a description will be made of the area of a light spot that is formed at a position located between the position where laser light L is incident vertically and the position where laser light L is incident obliquely in the case where a focusing angle θa is set so that the two light spot areas coincide with each other.

Figure 9:
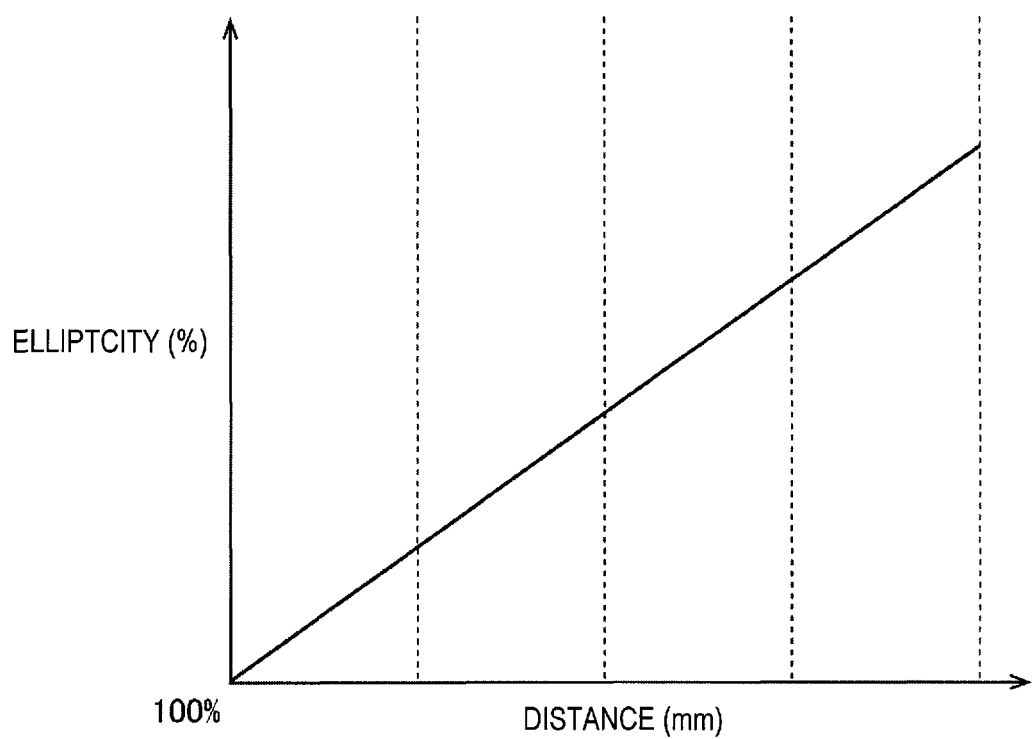
FIG. 9 is a graph showing a relationship between the distance and the ellipticity.
Figure 10:
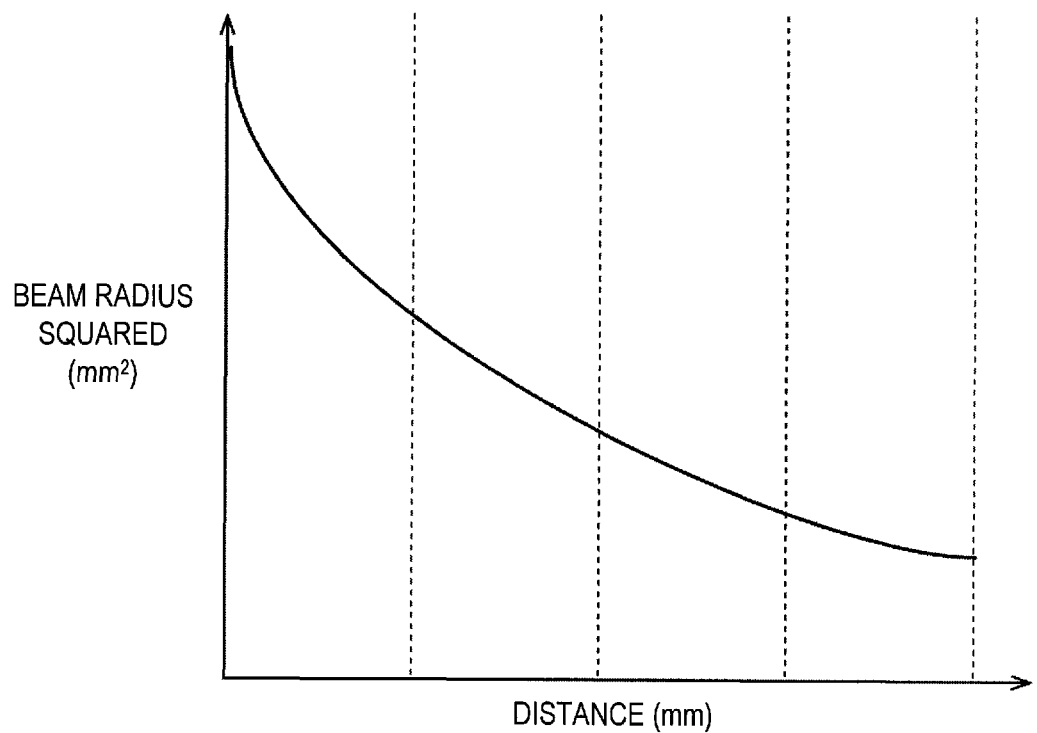
FIG. 10 is a graph showing a relationship between the distance and the square of the beam radius.

In FIG. 9, the term "ellipticity" means the percentage ratio of the area of a light spot formed at the position where laser light L is incident obliquely to the area (100%) of a light spot formed at the position where laser light L is incident vertically in a case that the laser light L is assumed to be parallel light.

As shown in FIG. 9, the ellipticity is proportional to the distance from the position where laser light L is incident vertically; the ellipticity increases with the distance. On the other hand, as shown in FIG. 10, the square of the beam radius of laser light L is inversely proportional to the distance. Thus, the ellipticity and the square of the beam radius have a relationship that one increases when the other decreases.

Figure 11:
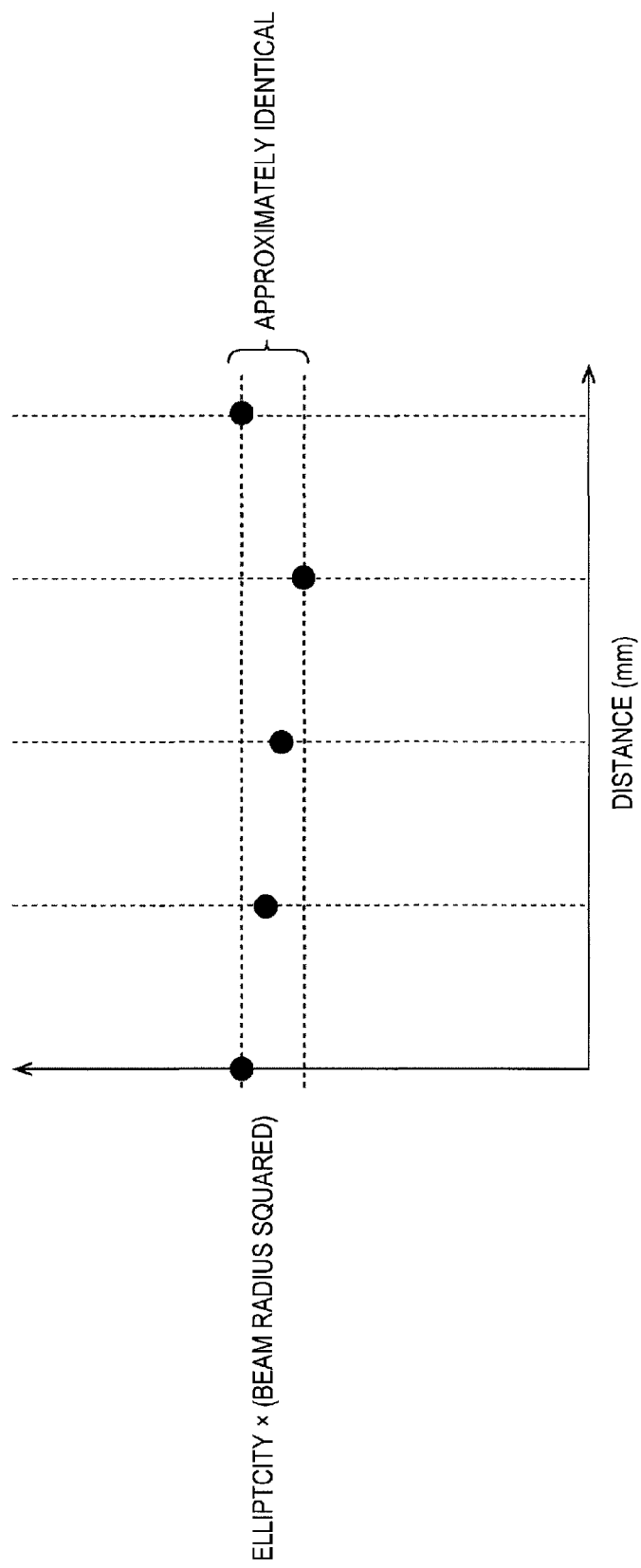
FIG. 11 is a graph showing a variation of light spot areas at intermediate positions.

As shown in FIG. 11, at intermediate positions, two light spot areas do not coincide with each other completely and have a small variation. However, if a section for processing is set properly on the optical path of laser light L according to the above-mentioned Equation (1), an area increase due to increase of the ellipticity and an area decrease due to decrease of the square of the beam diameter approximately coincide with each other and cancel out each other. As a result, the areas of light spots formed at intermediate positions are made approximately constant and a variation of light spot areas at the intermediate positions can be made sufficiently small. Thus, a variation of light spot areas can be reduced.

The above-mentioned term "approximately constant" means that the differences between the areas of light spots formed at intermediate positions and the area of a light spot formed at the position where laser light L is incident vertically are smaller than 3%, for example, of the area of the light spot formed at the position of vertical incidence.

(6) Laser Power Monitoring Unit 26

Next, the configuration of the laser power monitoring unit 26 will be described with reference to FIG. 1. The laser power monitoring unit 26 is equipped with a beam splitter 26A which is disposed on the optical path of laser light L and reflects a prescribed part of the laser light L, a focusing lens 26B which focuses the laser light reflected from the beam splitter 26A, a power detector 26C which detects laser light focused by the focusing lens 26B and outputs a voltage corresponding to a detected light quantity, an output unit (not shown) which outputs, to the control unit 20, as a laser power correlation value, a signal corresponding to the output voltage of the power detector 26C, and other components.

The beam splitter 24A can be a half-mirror, a polarizing mirror, or the like. The power detector 26C may be, for example, of a photoelectric type or a thermal type. Photoelectric power detectors include high-speed (high-response-speed) ones and low speed (low-response-speed) ones. In the embodiment, a high-speed photoelectric power detector is used as the power detector 26C.

In the embodiment, all of reflected laser light, rather than part of it, shines on the power detector 26C. This is done to lower the influence of noise etc. because a detection voltage tends to be influenced by noise etc. if only part of it shines on the power detector 26C. However, since in general the power detector 26C is expensive, in the embodiment the detection area of the power detector 26C is reduced by focusing laser light by the focusing lens 26B.

An alternative configuration is possible in which part of reflected laser light is converted into cylindrical laser light, which is shone on the power detector 26C. And the light quantity of the remaining, non-incident laser light is calculated. Another alternative configuration is possible in which a diffraction grating is provided in place of the focusing lens 26B and used for shining noiseless, flat laser light on the power detector 26C.

(7) Control Processes of Control Unit 20

A work processing process, a laser power monitoring process, and a teaching process as control processes of the control unit 20 will be described below.

(7-1) Work Processing Process

The work processing process is a process of processing the work B by controlling the laser oscillator 22 and the scanning unit 25. The control unit 20 controls the laser oscillator 22 to cause it to emit laser light L and scans the processing target surface of the work B by deflecting the laser light L by controlling the scanning unit 25 according to the processing pattern 11 and a work distance. As a result, the work B is processed.

(7-2) Laser Power Monitoring Process

The laser power monitoring process is a process of announcing occurrence of an error when the laser power of the laser oscillator 22 has come to exhibit an abnormal value. The laser power is not necessarily constant, that is, has larger values and smaller values over time. And the laser power may lower with age.

In view of the above, while the laser oscillator 22 is emitting laser light L, the control unit 20 acquires a laser power correlation value from the laser power monitoring unit 26 every predetermined sampling period and judges whether or not the acquired correlation value falls within a range between error judgment threshold values (an upper limit and a lower limit). If the correlation value is out of the range, the control unit 20 announces occurrence of an error by, for example, causing the display device of the input unit 21 to display a warning message.

Incidentally, there may exist a case that the processing target surface is scanned with laser light L along a curve. In this case, because of a response delay of the scanning unit 25, a scanning curve may have smaller radii of curvature when the scanning speed is high. To prevent this phenomenon, in making a curved scan, the control unit 20 lowers the scanning speed by controlling the scanning unit 25. However, when the scanning speed is lowered, each irradiation position is irradiated with laser light L for a longer time, as a result of which processing results are changed.

In view of the above, when the scanning speed is lowered, the laser power is corrected on the basis of correction values. The correction values may be either stored in the ROM in advance or set by a worker by manipulating the input unit 21. When having corrected the laser power, the control unit 20 corrects the above-mentioned error judgment threshold values in the following manner:

When the scanning speed has been lowered (i.e., the laser power correction value is smaller than "1"), decrease the lower limit error judgment threshold value by an offset value.

When the scanning speed has been increased (i.e., the laser power correction value is larger than "1"), increase the upper limit error judgment threshold value by an offset value.

When the scanning speed has not been corrected (i.e., the laser power correction value is equal to "1"), use original (uncorrected) error judgment threshold values. If an error judgment threshold value has already been corrected, cancel the correction.

Conventionally, to prevent an erroneous judgment to the effect that an error has occurred when the laser power is corrected, too large an upper limit value or too small a lower limit value is set. This may lead to a problem that error judgment cannot be made correctly when the laser power lowers slowly due to deterioration.

In contrast, where the error judgment threshold values are corrected in the above-described manner, the error judgment threshold values follow correction of the laser power automatically. As a result, error judgment can be made correctly even if the laser power lowers slowly due to deterioration.

(7-3) Teaching Process

The teaching process is a process of setting error judgment threshold values (described above) automatically. In the teaching process, the control unit 20 controls the laser welding machine 1 to process the work B actually. The control unit 20 sets upper limit and lower limit error judgment threshold values on the basis of a maximum value and a minimum value of laser power correlation values acquired during the work processing, and calculates offset values. Unlike in ordinary work processing, the control unit 20 makes no laser power error judgment during work processing in the teaching process.

Conventionally, fixed error judgment threshold values are used or a worker sets error judgment threshold values by manipulating an input unit. However, if fixed error judgment threshold values are used, it is impossible to set error judgment threshold values that are suitable for each laser welding machine. Where error judgment threshold values are set by a worker, it may be difficult to set proper threshold values.

In contrast, the above-described teaching process makes it possible to set error judgment threshold values that are suitable for each laser welding machine 1, without a worker's being aware of that. Furthermore, since offset values are calculated on the basis of upper limit and lower limit error judgment threshold values, error judgment can be made more correctly when the laser power has been corrected.

(8) Advantages of Embodiment

In the above-described laser welding machine 1, a variation of light spot areas can be reduced without using any additional focusing lens by setting the focusing unit 23 so as to focus laser light L so that the area of a light spot formed at the position where laser light L is incident on a flat processing target surface vertically approximately coincides with that of a light spot formed at the position P where laser light L is incident obliquely. As a result, the laser welding machine 1 can be simplified in configuration. Furthermore, since the focusing unit 23 need not follow the scanning unit 25 during work processing, the focusing unit 23 can be simplified in structure. As a result, reduction of processing quality due to a variation of light spot areas can be suppressed by a simple configuration and hence the manufacturing cost can be reduced.

In the laser welding machine 1, since the focusing unit 23 is set so that laser light L is focused so as to equalize light spot areas at the center and the position P, a variation of light spot areas can be reduced over the entire processing target surface of the work B.

In the laser welding machine 1, since the focusing position for the focusing unit 23 is set outside the processing region 12 of the laser welding machine 1, even if the work size is changed, a variation of light spot areas can be reduced over the entire processing target surface of the new work.

In the laser welding machine 1, since a focal position in the direction in which the laser light L is incident vertically can be set at the position P using the focusing unit 23, a variation of light spot areas can be reduced over the entire processing target surface of the work B.

Furthermore, in the laser welding machine 1, the holder 24B is prevented from rotating about the optical axis. Since the center axis of the magnifying lens 23A does not necessarily coincide with the axis of laser light L, if the holder 24B rotated, the center axis of the magnifying lens 23A would be rotated about the axis of laser light L to render it difficult to set a focusing angle θa. This problem can be solved by preventing rotation of the holder 24B about the axis of laser light L.

Still further, in the laser welding machine 1, since the laser power is monitored by the laser power monitoring unit 26, the probability of occurrence of an event that the work B is processed with an abnormal laser power can be lowered.

Associated Technique

Next, a technique relating to the embodiment of the invention will be described with reference to FIG. 6. In the above-described embodiment, a focal position is set by deflecting laser light L so that it reaches the position P which is located outside the processing target surface of the work B. Alternatively, a focal position may be set by deflecting laser light L so that it reaches a position(s) on the processing target surface of the work B, for example, the four corners of the processing pattern 11 shown in FIG. 6.

Other Embodiments

The technical scope of the invention is not limited to the embodiment described above with reference to the drawings but encompasses, for example, the following embodiments:

(1) In the above-described embodiment, the position P is located outside the processing region 12. However, the position P may be located in the processing region 12 as long as it is more distant from the position where laser light L is incident vertically than a position that is farthest from the position of vertical incidence in the processing target surface of a work is.

However, where the position P is set in the working region 12, the position P may be located in the processing target surface of a work if the position P is fixed and the work is wide. Therefore, to make it possible to reduce a variation of light spot areas in the entire processing target surface of each work, the laser welding machine 1 may be configured so that the position P can be adjusted. With this measure, even if the work size is changed, a variation of light spot areas can be reduced in the entire processing target surface of the new work by setting a focusing position outside the processing target surface of the new work.

(2) In the above-described embodiment, a focusing angle θa is set manually in such a manner that a worker rotates the adjustment screw 24D. Alternatively, a focusing angle θa may be set automatically using a motor that is provided to move the holder 24B. For example, a configuration is possible in which focusing angles θa that realize coincidence of light spot areas for plural respective work distances of, for example, 300 to 330 mm are stored in the ROM in advance and, when a work distance is input by a worker, the control unit 20 sets a focusing angle θa corresponding to the input work distance automatically by controlling the motor. Instead of storing focusing angles θa corresponding to respective work distances, a focusing angle θa that realizes coincidence of light spot areas may be calculated on the basis of an input work distance.

(3) Although in the above-described embodiment the focusing unit 23 for focusing laser light L is equipped with the magnifying lens 23A and the focusing lens 23B, the focusing unit 23 need not always be configured in this manner as long as it can set a focusing angle θa. For example, the focusing unit 23 may be one using a liquid lens. Where a liquid lens is used, a focusing angle θa can be set by compressing the liquid lens. For another example, the focusing unit 23 may be one using an electro-optical lens. The electro-optical lens makes it possible to set a focusing angle θa electrically.

(4) The above-described embodiment is such that the laser welding machine 1 can accommodate the work distance range of 300 to 330 mm. Alternatively, where it is determined in advance that only one type of work is to be processed and hence a work distance is always fixed, a laser processing machine that is not equipped with the setting unit 24 may be constructed by setting a focusing angle θa according to a work distance at the time of shipment and shipping the laser processing machine employing it as a fixed value. In this case, reduction of processing quality due to a variation of light spot areas can be suppressed by a simpler configuration though a processable work type is restricted.

(5) In the above-described embodiment, the focusing unit 23 and the setting unit 24 are such that a focusing angle θa is set by moving (sliding) only the magnifying lens 23A. An alternative configuration is possible in which to set both of a focusing angle θa and a beam diameter of laser light to shine on a work, plural lenses are moved along the optical axis independently of or in link with each other.

(6) Although in the above-described embodiment no focusing lens is disposed between the scanning unit 25 and the work B, a focusing lens (e.g., fθ lens) may be disposed there.

(7) Although the above-described embodiment is directed to the laser welding machine 1 as an example laser processing machine, the invention can be applied to other kinds of laser processing machines such as what is called a laser marking machine for forming characters, symbols, figures, etc. on the surface of a work.

What is claimed is:

1. A laser processing machine comprising:
a laser oscillator which emits laser light;
a scanning unit which scans a processing target surface of a work by deflecting the laser light emitted from the laser oscillator; and
a focusing unit which is disposed between the laser oscillator and the scanning unit and which focuses the laser light emitted from the laser oscillator,
wherein the focusing unit is set so as to focus the laser light at a second position that is more distant from a first position where the laser light is incident vertically than a third position that is farthest from the first position in the processing target surface of the work.

2. The laser processing machine according to claim 1, wherein a focusing position of the focusing unit is adjustable.

3. The laser processing machine according to claim 1, wherein the focusing unit focuses the laser light at a position that is located outside a processing region of the laser processing machine.

4. The laser processing machine according to claim 1, wherein the focusing unit is configured such that a focal position of the focusing unit in a direction in which the laser light is incident vertically is allowed to be set at the second position.

5. A focusing angle setting method of a laser processing machine comprising a laser oscillator which emits laser light, a scanning unit which scans a processing target surface of a work by deflecting the laser light emitted from the laser oscillator, a focusing unit which is disposed between the laser oscillator and the scanning unit and focuses the laser light emitted from the laser oscillator, and a setting unit which sets a focusing angle of the focusing unit before processing of the work,
said focusing angle setting method comprising:
setting a focusing angle using the setting unit such that an area of a light spot formed on a flat processing target surface at a first position where the laser light is incident vertically approximately coincides with that of a light spot formed at a second position that is distant from the first position and where the laser light is incident obliquely.

* * * * *